Jan. 19, 1937. H. S. YOUNG ET AL Re. 20,248

RAILWAY SIGNALING SYSTEM

Original Filed May 27, 1932 2 Sheets-Sheet 1

INVENTORS
Ronald A. McCann and
Henry S. Young.
BY
A. R. Vancill
THEIR ATTORNEY

RAILWAY SIGNALING SYSTEM

Original Filed May 27, 1932 2 Sheets-Sheet 2

INVENTORS
Ronald A. McCann and
Henry S. Young.
BY A. R. Terrill
THEIR ATTORNEY

Reissued Jan. 19, 1937

Re. 20,248

UNITED STATES PATENT OFFICE 20,248

RAILWAY SIGNALING SYSTEM

Henry S. Young, Wilkinsburg, and Ronald A. McCann, Swissvale, Pa., assignors to The Union Switch & Signal Company, Swissvale, Pa., a corporation of Pennsylvania Original No. 1,958,177, dated May 8, 1934, Serial No. 613,964, May 27, 1932. Renewed September 27, 1933. Application for reissue July 30, 1935, Serial No. 33,866

9 Claims. (Cl. 246—33)

Our invention relates to railway signaling systems, and particularly to such systems which involve light signals controlled by track circuits.

One feature of our invention is the provision of means for preventing an undesirable momentary operation of a signal when a light engine or a car passes at high speed from one track section to another, if the track relay for the rear section closes before the track relay for the forward section opens.

We will describe two forms of railway signaling systems embodying our invention, and will then point out the novel features thereof in claims.

Figure 1:
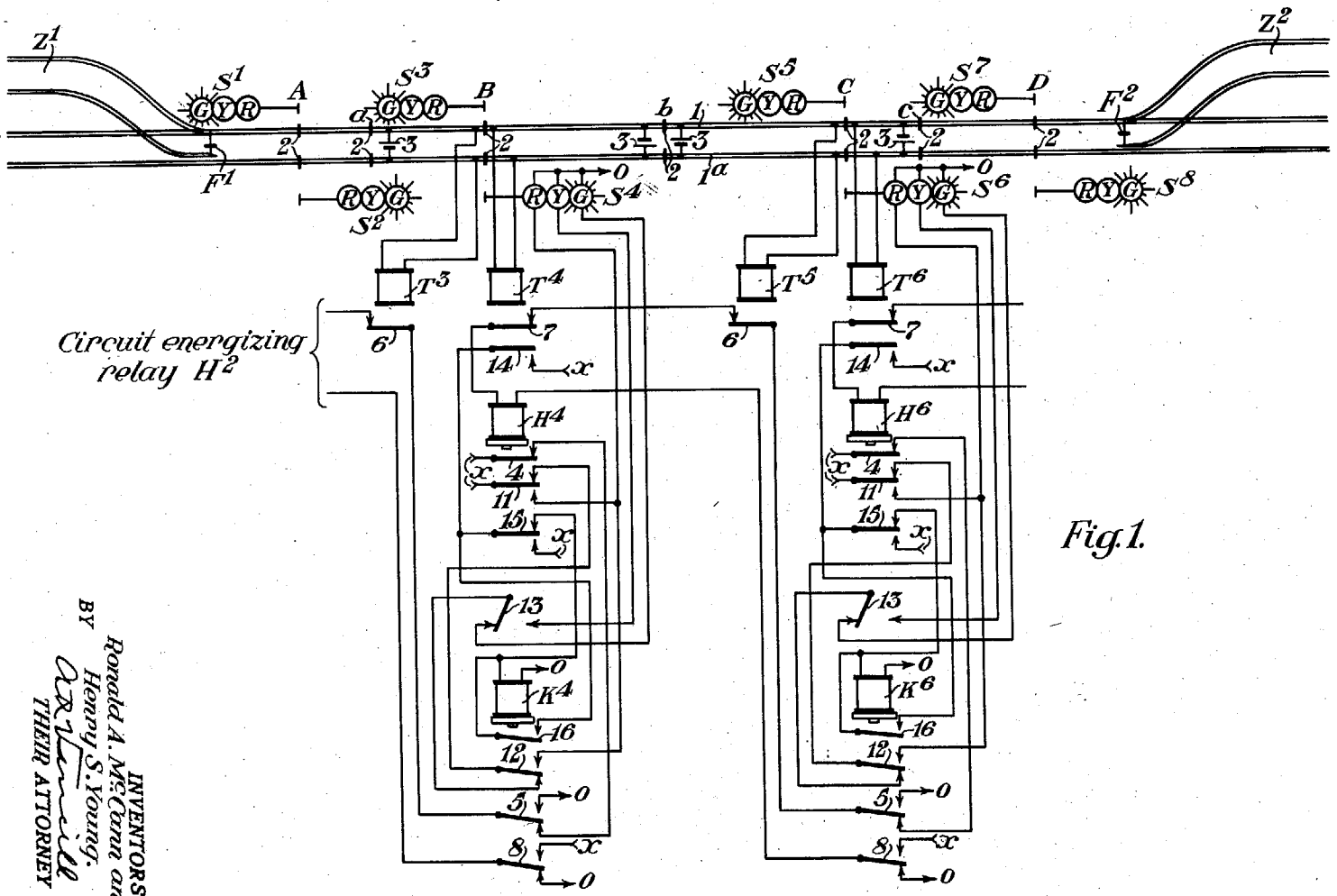
Figure 2:
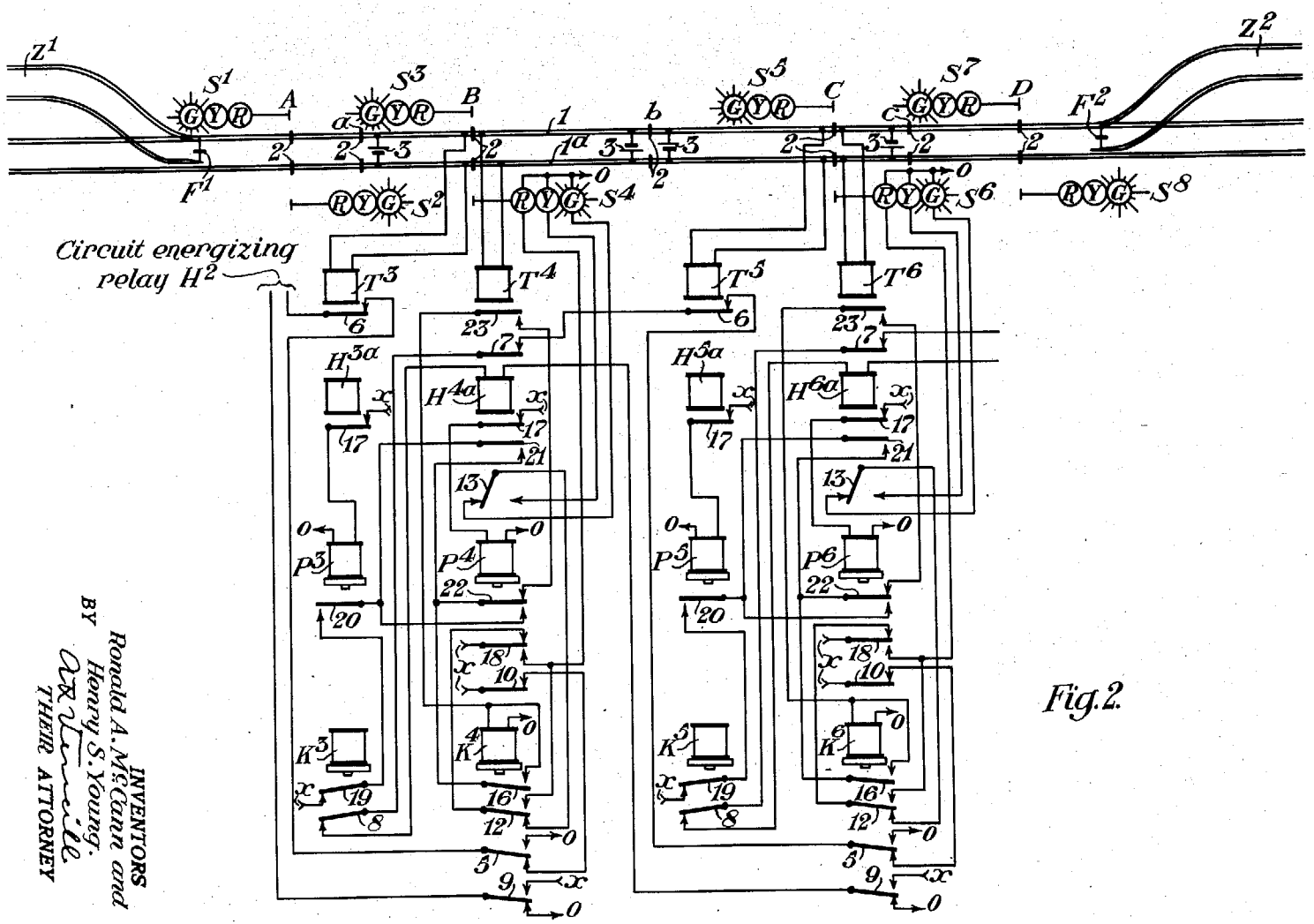

In the accompanying drawings, Fig. 1 is a diagrammatic view showing one form of signaling system embodying our invention. Fig. 2 is a diagrammatic view showing a modification of the signaling system shown in Fig. 1, and also embodying our invention.

Similar reference characters refer to similar parts in each of the views.

Referring first to Fig. 1, the reference characters 1 and 1[a] designate the track rails of a stretch of single track railway over which traffic may normally move in either direction. Two passing sidings, $Z^1$ and $Z^2$, are connected with this stretch of track by means of switches $F^1$ and $F^2$, respectively.

The stretch of track between switches $F^1$ and $F^2$ is divided by means of insulated joints 2 into blocks A—B, B—C, and C—D. Each of these blocks is divided into two sections by means of insulated joints 2 located at the points *a*, *b*, and *c*, intermediate the ends of the blocks, respectively. Block A—B, for example, is divided into sections A—*a*, and *a*—B. Each of these track sections is provided with a track circuit comprising a battery 3 connected across the rails adjacent one end of the section, and a relay designated by the reference character T with a distinguishing exponent and connected across the rails adjacent the opposite end of the section.

We will assume that traffic movements over this stretch of track toward the right, as shown in the drawings, are eastbound, and that traffic movements toward the left are westbound. Eastbound traffic movements are controlled by trackway signals $S^2$. $S^4$, $S^6$, and $S^8$ located at points A, B, C, and D, respectively. Westbound traffic movements are controlled by similar signals $S^1$, $S^3$, $S^5$, and $S^7$ located opposite the westbound signals, respectively, at points A, B, C, and D. As here shown, each of the signals S comprises two proceed lamps G and Y indicating, when lighted, "clear" and "caution", respectively, and a stop lamp R. Our invention is, however, not limited to this particular type of signal.

Each of the signals $S^3$, $S^4$, $S^5$, and $S^6$ is controlled by a polarized relay, designated by the reference character H with a corresponding exponent, and by a slow-releasing directional stick relay designated by the reference character K with a corresponding exponent. Each of the polarized relays H is so constructed that its neutral armature remains closed during the reversal of polarity of current supplied to its control winding. The circuits for controlling signals $S^3$ and $S^5$ are exactly similar to the circuits for signals $S^6$ and $S^4$, respectively, and are therefore omitted from the drawing.

The lighting circuits for the proceed lamps of each signal S include a back contact of the associated stick relay K and a front neutral and a polar contact of the associated polarized relay H. The stop lamp R for each signal S has one lighting circuit which includes a back contact of its relay H, and has a second circuit which include a front contact of its relay H and also a front contact of its relay K. Relay $H^2$ for controlling signal $S^2$, and each of the relays $H^3$, $H^5$, and $H^7$, not shown in the drawings, for controlling signals $S^3$, $S^5$, and $S^7$, respectively, has a normal energizing circuit which includes a back contact of the relay K for the next signal in advance and a front contact of the relay H for the same signal. Each of these same relays H has a reverse energizing circuit which includes front contacts of the relay K for the next signal in advance.

As shown in the drawings, all parts are in their normal condition, that is, each of the track sections is clear, relays K are deenergized, and relays H are energized in the normal direction. The normal control circuit by which relay $H^4$ is energized passes from terminal *x* of a source of current not shown in the drawings, through contact 4 of relay $H^6$, back point of contact 5 of relay $K^6$, contact 6 of relay $T^5$, contact 7 of relay $T^4$, winding of relay $H^4$, and the back point of contact 8 of relay $K^6$ to terminal *o* of the same source of current. With relay $H^4$ energized in the normal direction, and with relay $K^4$ deenergized, the clear lamp G of signal $S^4$ is lighted by a circuit passing from terminal *x*, through the front point of contact 11 of relay $H^4$, back point of contact 12 of relay $K^4$, contact 13 of relay $H^4$ closed in the left-hand position, and lamp G to terminal *o*.

We will now assume that an eastbound train passing signal $S^4$ enters section B—*b*, deenergizing relay $T^4$. Contact 7 of relay $T^4$ thereupon opens the circuit for relay $H^4$, which then, becoming deenergized, permits its contact 11 to close, at its back point, a circuit for energizing lamp R of signal $S^4$. The deenergization of relay $T^4$ also causes relay $K^4$ to become energized by its pick-up circuit passing from terminal *x*, through contact 14 of relay $T^4$, front point of contact 15 of relay $H^4$, and the winding of relay $K^4$ to terminal *o*. Although not so slow-releasing as relay $K^4$, the neutral armature of relay $H^4$ is slightly slow-releasing, and hence relay $K^4$ has time to become energized and close its front contact 16 before contact 15 of relay $H^4$ opens at its front point. Contact 16 of relay $K^4$, upon becoming closed, completes a stick circuit for relay $K^4$, passing from terminal *x*, through contact 14 of relay $T^4$, contact 16 of relay $K^4$, and the winding of relay $K^4$ to terminal *o*. Contact 15 of relay $H^4$, upon closing at its back point, completes a second stick circuit for relay $K^4$, passing from terminal *x*, through the back point of contact 15, contact 16 of relay $K^4$, and the winding of relay $K^4$ to terminal *o*. As the train proceeds further and enters section *b*—C, relay $T^5$ becomes deenergized, permitting its contact 6 to open in the circuit for relay $H^4$.

If the train were so short and moved so quickly past the point *b* that relay $T^4$ became energized before relay $T^5$ permitted its contact 6 to open, relay $H^4$ would become energized and close its front contact 4 and open its contact 15 at its back point. With relay $T^4$ energized, and with relay $H^4$ energized, both stick circuits for relay $K^4$ would be open, but relay $K^4$ being slow-releasing, does not at once permit its contact 12 to close at its back point, and hence neither of the proceed lamps of signal $S^4$ could become lighted. Lamp R of signal $S^4$, however, is now lighted by a second circuit, passing from terminal *x*, through the front point of contact 11 of relay $H^4$, front point of contact 12 of relay $K^4$, and lamp R to terminal *o*. Before relay $K^4$, which is slower releasing than the neutral armature of relay $H^4$, will have permitted its contact 12 to close at its back point, relay $T^5$ will have permitted its contact 6 to open and cause relay $H^4$ to again open its contact 11 at its front point, thus preventing either proceed lamp Y or G of signal $S^4$ from becoming lighted when a short train passes quickly over the insulated joints at point *b*.

When the train passes signal $S^6$, causing relay $T^6$ to become deenergized, relay $H^6$ will become deenergized due to the opening of contact 7 of relay $T^6$, and hence contact 4 of relay $H^6$ will open in the normal control circuit previously traced for relay $H^4$. Relay $K^6$ becomes energized by a circuit which is exactly similar to the pick-up circuit traced for relay $K^4$. When the train leaves section *b*—C, the reverse control circuit is completed for relay $H^4$, passing from terminal *x*, through the front point of contact 8 of relay $K^6$, winding of relay $H^4$, contact 7 of relay $T^4$, contact 6 of relay $T^5$, and the front point of contact 5 of relay $K^6$ to terminal *o*.

If the train were so short and moved so quickly past point C adjacent signal $S^6$ that relay $T^5$ became energized before relay $H^6$ permitted its contact 4 to open, relay $H^4$ would become energized in the normal direction by its normal control circuit, and would then open its contact 15 at the back point and would close its front contacts 4, 11 and 15. Before relay $K^4$ will have permitted its contact 12 to close at its back point, relay $H^6$ will have permitted its contact 4 to open and cause relay $H^4$ to again open its contact 11 at its front point, thus preventing proceed lamp G of signal $S^4$ from becoming lighted, similarly to the way in which proceed lamps Y and G of signal $S^4$ are prevented from becoming lighted when a short train passes quickly over the insulated joints adjacent point *b* as previously described.

It will be noted that if relay $K^6$ should fail to pick up when a train enters section C—*c*, the only way in which relay $H^4$ could become energized would be for a very brief period as described in the next preceding paragraph. If relay $K^6$ should fail to pick up, and should remain deenergized when the train leaves section *b*—C, the circuit for relay $H^4$ will be open at contact 4 of relay $H^6$, and hence signal $S^4$ will continue to display a stop indication.

When the train enters section *c*—D, the track relay for this section will open the circuit for relay $H^6$ similarly to the manner in which track relay $T^5$ opens the circuit for relay $H^4$ when the train enters section *b*—C.

If the train were so short and moved so quickly past point *c* that relay $T^6$ closed its front contact before the track relay for section *c*—D permitted its front contact to open, or if for any other reason the circuit for relay $H^6$ were momentarily closed, relay $H^6$ would be momentarily energized by current of normal polarity, and would therefore open its contact 15 at the back point. Relay $K^6$ would therefore be deenergized but, on account of its slow-releasing characteristic, would not at once open its front contacts. Relay $K^6$ is slower releasing than relay $H^6$, and hence the track relay for section *c*—D will open its front contact in the circuit for relay $H^6$ and cause relay $H^6$ to again complete the stick circuit for relay $K^6$ before the front contacts of relay $K^6$ open. The front contacts of relay $K^6$ will therefore remain closed and retain relay $H^4$ in the reverse energized condition, thus causing signal $S^4$ to continue to display the caution indication, whereas if relay $K^6$ were so quick releasing that, in the event of a momentary energization of relay $H^6$, the back contacts of relay $K^6$ would close, as when a short train moves rapidly over the joints at location *c*, signal $S^4$ would momentarily falsely display the clear proceed indication.

Referring now to Fig. 2, the track circuits and the signals are here arranged as in Fig. 1. The relays H of Fig. 2 are not necessarily of the type having a neutral armature which does not drop during the reversal of polarity of the current supplied to the control winding. Each of the relays H in Fig. 2 may be of the usual polarized type which is so constructed that its neutral armature is released during the reversal of polarity of its control current. For each relay H in Fig. 2, there is also a slow-releasing relay P which is controlled by a front contact of the associated relay H. Slow-releasing stick relays K are provided as in Fig. 1, but their control circuits differ from those shown for the relays K of Fig. 1. In Fig. 2, each relay K is controlled by an associated relay P and by the relays K and P for the adjacent opposing signal, as well as by its associated relays H and T.

As shown in the drawings, all parts are in their normal condition, that is, track relays T are energized, and signals S are indicating "clear". Each of the relays H is energized by a normal control circuit which is exactly the same as the corresponding circuit in Fig. 1 except that it includes a contact 8 of the relay K for the adjacent opposing signal, and a contact 10 of the relay P for the next signal in advance instead of the front contact 4 of the relay H for the signal in advance. With relays H energized, each relay P is energized by a circuit including the front contact 17 of the associated relay H. Each of the relays K is deenergized.

We will now assume that an eastbound train passes signal $S^4$, thereupon deenergizing relay $T^4$ which deenergizes relay $H^{4a}$ and thereby causes the associated relay $K^4$ to become energized by its pick-up circuit passing from terminal *x*, through contact 19 of relay $K^3$, contact 20 of relay $P^3$ which is deenergized on account of the associated relay $H^{3a}$ being deenergized, contact 21 of relay $H^{4a}$, front point of contact 22 of relay $P^4$, contact 23 of relay $T^4$, and the winding of relay $K^4$ to terminal *o*. Relay $K^4$, upon becoming thus energized, completes its own stick circuit which is the same as the pick-up circuit just traced as far as contact 21 of relay $H^{4a}$, and which then passes through contact 16 of relay $K^4$ and the winding of relay $K^4$ to terminal *o*. After a brief interval of time, relay $P^4$ will release its contacts, causing the back point of its contact 22 to complete a branch path around contact 21 of relay $H^{4a}$ in the stick circuit just traced for relay $K^4$.

Relay $K^4$, upon becoming energized, opens, at the back point of its contact 12, the circuit for the clear lamp G of signal $S^4$, which is the same as the circuit previously traced for the corresponding lamp in Fig. 1, except that it includes the front point of contact 18 of relay $P^4$ instead of the front point of contact 11 of relay $H^4$. Upon the energization of relay $K^4$, a circuit is completed for the red lamp of signal $S^4$ for a brief period before relay $P^4$ releases, passing from terminal *x*, through the front point of contact 19 of relay $P^4$, front point of contact 12 of relay $K^4$, and lamp R of signal $S^4$ to terminal *o*. When relay $P^4$ releases its contacts, a second circuit is completed for the stop lamp R of signal $S^4$, passing from terminal *x*, through the back point of contact 18 of relay $P^4$, and lamp R to terminal *o*.

When the train enters section *b*—C, relay $T^5$ will become deenergized, thereby opening its contact 6 in the circuit for relay $H^{4a}$ which is, however, already open at contact 7 of relay $T^4$. If the train were short and moved so rapidly past the insulated joints at point *b* that relay $T^4$ would close its front contacts before relay $T^5$ has released its front contacts, relay $H^{4a}$ would become energized in the normal direction. Relay $P^4$ would then become energized by its circuit through contact 17 of relay $H^{4a}$. Lamp R for signal $S^4$ would, however, continue lighted by its circuit previously traced through the front point of contact 18 of relay $P^4$ and the front point of contact 12 of relay $K^4$, since relay $K^4$ is slow-releasing. On account of relay $K^4$ being slow-releasing and preventing its contact 12 from closing at its back point for a brief period of time, the clear lamp G of signal $S^4$ cannot become lighted. Before relay $K^4$ has released its front contacts, relay $T^5$ will have released its front contact 6, and hence relay $H^{4a}$ will have become deenergized and will therefore have completed at its contact 21, the stick circuit described for relay $K^4$. In this way, neither the caution lamp Y nor the clear lamp G can become falsely lighted in the event of a very short train or a single car passing quickly over the insulated joints at point *b*.

As the train proceeds further and enters section C—*c*, relays $T^6$ and $H^{6a}$ will become deenergized and relay $K^6$ will become energized similarly to the manner in which relays $T^4$ and $H^{4a}$ became deenergized and relay $K^4$ became energized when the train passed signal $S^4$ as previously described. The energization of relay $K^6$ causes current of reverse polarity to be supplied to relay $H^{4a}$ as soon as relay $T^5$ has closed its front contact 6. The circuit by which this is done is the same as the normal control circuit previously described for relays H except that it does not include contact 10 of relay $P^6$ and it is supplied with current from terminal *x*, through the front point of contact 9, and the front point of contact 5 of relay $K^6$ instead of through the back points of contacts 5 and 9. The caution lamp Y of signal $S^4$ will thereupon become lighted by a circuit which is exactly similar to the circuit for the corresponding lamp of signal $S^4$ in Fig. 1 except that in Fig. 2, the circuit for the caution lamp passes through the front point of contact 18 of relay $P^4$ instead of through the front point of contact 11 of relay $H^4$ as in Fig. 1.

If the train were very short and passed rapidly over the insulated joints at the point C, the normal control circuit previously described for relay $H^{4a}$ would become energized, causing relays $H^{4a}$ and $P^4$ to become energized. Relay $K^4$ being slow-releasing, however, causes lamp R of signal $S^4$ to continue lighted, and prevents lamp G of signal $S^4$ from becoming lighted. Relay $K^6$ will become energized and reverse the polarity of relay $H^{4a}$ before relay $K^4$ has released, and hence lamp Y will then become lighted. In this way, lamp G is prevented from becoming falsely lighted when a short train passes quickly over the insulated joints at point C.

If, due to a broken connection or some other cause, relay $K^6$ does not become energized when a train deenergizes relay $T^6$, relay $H^{4a}$ will remain deenergized since contact 10 of relay $P^6$ will be open. In this way, protection is provided against lamp G becoming falsely lighted in the event of relay $K^6$ failing to become energized.

The circuits for westbound signals $S^3$ and $S^5$ are exactly similar to the circuits for eastbound signals $S^6$ and $S^4$, respectively. We have already pointed out that the circuits for signals $S^5$ and $S^3$ of Fig. 1 are similar to the circuits for signals $S^4$ and $S^6$, respectively, of Fig. 1. The operation of the apparatus for westbound train movements will, therefore, be similar in every respect to that which we have described for eastbound train movements for the apparatus shown in both Figs. 1 and 2.

Although we have herein shown and described only two forms of railway signaling systems embodying our invention, it is understood that various changes and modifications may be made therein within the scope of the appended claims without departing from the spirit and scope of our invention.

Having thus described our invention, what we claim is:

1. In combination, a stretch of railway track divided into sections, signals governing traffic in both directions through said stretch and each comprising a "clear" lamp and a "caution" lamp and a "stop" lamp, a polarized line relay for each signal characterized by the fact that its neutral armature remains closed during reversal of the current supplied to its operating winding, a slow-releasing stick relay for each signal, a line circuit for each line relay including back contacts of the stick relay for the signal next in advance and a front neutral contact of the line relay for such signal next in advance as well as a source of current of normal polarity, means operating when such stick relay is closed to directly supply current of reverse polarity to such line circuit, track circuits for the sections including track relays for the control of said line circuits, a pick-up circuit for each stick relay including a front neutral contact of the associated line relay and a back contact of the track relay for the first section in advance of the associated signal, two stick circuits for each stick relay one including a back contact of the associated line relay and the other including a back contact of the last mentioned track relay, a "clear" lamp circuit for each signal including a normal polar contact and a front neutral contact of the associated line relay as well as a back contact of the associated stick relay, a "caution" lamp circuit for each signal including the same elements as the "clear" lamp circuit except a reverse polar contact of the line relay, and two "stop" lamp circuits for each signal, one including a back neutral contact of the associated line relay, and the other including a front contact of such associated line relay and a front contact of the associated stick relay.

2. In combination, a stretch of railway track divided into sections, signals governing traffic in both directions through said stretch and each comprising a "clear" lamp and a "caution" lamp and a "stop" lamp, a polarized line relay and a slow-releasing repeater relay and a slow-releasing stick relay for each signal, means for energizing each repeater relay when the associated line relay is energized in either direction, means operating when a given repeater relay is closed and the associated stick relay is open to supply current of normal polarity to the line relay for the signal next in the rear, means operating when a stick relay is closed to directly supply current of reverse polarity to the line relay for the signal next in the rear, track circuits for said sections for controlling said line relays, means for energizing each stick relay when a train moving in the direction in which the associated signal governs traffic passes such signal and for keeping it energized until the train passes the next signal, means operating when a line relay is energized and the associated stick relay is open to energize the clear or the caution lamp of the associated signal according as the line relay is supplied with current of normal or reverse polarity, and means for energizing the stop lamp of each signal when the associated repeater relay is open, and also when such repeater relay is closed provided the associated stick relay is also closed.

3. In combination, a stretch of railway track divided into sections, signals governing traffic in both directions through said stretch and each comprising a "clear" lamp and a "caution" lamp and a "stop" lamp, a polarized line relay and a slow-releasing stick relay for each signal, means operating when a given line relay is closed and the associated stick relay is open to supply current of normal polarity to the line relay for the signal next in the rear, means operating when a stick relay is closed to directly supply current of reverse polarity to the line relay for the signal next in the rear, track circuits for said sections for controlling said line relays, means for energizing each stick relay when a train moving in the direction in which the associated signal governs traffic passes such signal and for keeping it energized until the train passes the next signal, means operating when a line relay is energized and the associated stick relay is open to energize the clear or the caution lamp of the associated signal according as the line relay is supplied with current of normal or reverse polarity, and means for energizing the stop lamp of each signal when the associated line relay is open, and also when such line relay is closed provided the associated stick relay is also closed.

4. In combination, a stretch of railway track comprising a first and a second section, a signal capable of displaying a stop indication or a proceed indication for governing traffic movements through both of said sections, a track circuit for each of said sections each provided with a track relay, a line relay, means controlled by each of said track relays for controlling said line relay, a stick relay, means for energizing said stick relay when a train enters said first section and for keeping it energized until the train leaves said second section, a circuit including a front contact of said line relay and a back contact of said stick relay for controlling the proceed indication of said signal, a circuit including a back contact of said line relay for controlling said stop indication, and a second circuit including a front contact of said line relay and a front contact of said stick relay for controlling said stop indication.

5. In combination, a stretch of railway track, a signal capable of displaying a first or a second indication for governing traffic movements in said stretch, a signal relay, a stick relay, a pick-up circuit for said stick relay which becomes closed when a train enters a given portion of said stretch while said signal relay is energized, a stick circuit for said stick relay including a back contact of said signal relay, a circuit controlled by a front contact of said signal relay and by a back contact of said stick relay for controlling said first indication, and a circuit controlled by a front contact of said signal relay and by a front contact of said stick relay for controlling said second indication.

6. In combination, a stretch of railway track, a signal capable of displaying a first or a second indication for governing traffic movements in said stretch, a signal relay, a circuit controlled by traffic conditions in said stretch for controlling said relay, a stick relay, means controlled by a train entering said stretch for energizing said stick relay and for keeping it energized until the train leaves said stretch, a circuit controlled by a front contact of said signal relay and by a back contact of said stick relay for causing said signal to display said first indication, and a circuit controlled by a back contact of said signal relay for causing said signal to display said second indication.

7. In combination, a stretch of railway track, a signal capable of displaying a first or a second indication for governing traffic movements in said stretch, a signal relay, a circuit controlled by traffic conditions in said stretch for controlling said relay, a stick relay, means controlled by a train entering said stretch for energizing said stick relay and for keeping it energized until the train leaves said stretch, a circuit controlled by a front contact of said signal relay and by a back contact of said stick relay for causing said signal to display said first indication, and a circuit controlled by a front contact of said signal relay and by a front contact of said stick relay for causing said signal to display said second indication.

8. In combination, a stretch of railway track comprising a first and a second section, a signal capable of displaying a stop indication or a proceed indication for governing traffic movements through both of said sections, a track circuit for each of said sections each provided with a track relay, a line relay, means controlled by each of said track relays for controlling said line relay, a stick relay, means for energizing said stick relay when a train enters said first section and for keeping it energized until the train leaves said second section, a circuit including a front contact of said line relay and a back contact of said stick relay for controlling the proceed indication of said signal, and a circuit controlled by a back contact of said line relay for controlling said stop indication.

9. In combination, a stretch of railway track comprising a first and a second section, a signal capable of displaying a stop indication or a proceed indication for governing traffic movements through both of said sections, a track circuit for each of said sections each provided with a track relay, a line relay, means controlled by each of said track relays for controlling said line relay, a stick relay, means for energizing said stick relay when a train enters said first section and for keeping it energized until the train leaves said second section, a circuit including a front contact of said line relay and a back contact of said stick relay for controlling the proceed indication of said signal, and a circuit controlled by a front contact of said line relay and by a front contact of said stick relay for controlling said stop indication.

HENRY S. YOUNG.
RONALD A. McCANN.